(12) United States Patent
Hayashi et al.

(10) Patent No.: US 12,067,307 B2
(45) Date of Patent: Aug. 20, 2024

(54) DOCUMENT MANAGEMENT APPARATUS CAPABLE OF OUTPUTTING PRINT DATA FOR WHICH A PRINT RESERVATION IS MADE, AND NON-TRANSITORY COMPUTER READABLE MEDIUM

(71) Applicant: FUJIFILM Business Innovation Corp., Tokyo (JP)

(72) Inventors: Manabu Hayashi, Kanagawa (JP); Tatsuo Mishima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 456 days.

(21) Appl. No.: 17/327,798

(22) Filed: May 24, 2021

(65) Prior Publication Data
US 2022/0179599 A1 Jun. 9, 2022

(30) Foreign Application Priority Data
Dec. 7, 2020 (JP) ................................. 2020-202390

(51) Int. Cl.
| | |
|---|---|
| G06F 3/12 | (2006.01) |
| G06F 3/14 | (2006.01) |
| G06F 21/31 | (2013.01) |
| G06Q 30/04 | (2012.01) |

(52) U.S. Cl.
CPC .......... *G06F 3/1222* (2013.01); *G06F 3/1238* (2013.01); *G06F 3/1288* (2013.01); *G06F 3/14* (2013.01); *G06F 21/31* (2013.01); *G06Q 30/04* (2013.01); *G06F 3/1224* (2013.01)

(58) Field of Classification Search
None
See application file for complete search history.

(56) References Cited

U.S. PATENT DOCUMENTS

| | | | |
|---|---|---|---|
| 10,127,394 B2* | 11/2018 | Maki | G06F 3/1222 |
| 2004/0190049 A1* | 9/2004 | Itoh | G06F 3/1205 |
| | | | 358/1.15 |
| 2013/0242343 A1* | 9/2013 | Ikeuchi | H04N 1/348 |
| | | | 358/1.15 |

(Continued)

FOREIGN PATENT DOCUMENTS

| | | |
|---|---|---|
| JP | 2014-178899 | 9/2014 |
| JP | 5779971 | 9/2015 |
| JP | 2016-146137 | 8/2016 |

*Primary Examiner* — Haris Sabah
(74) *Attorney, Agent, or Firm* — JCIPRNET

(57) ABSTRACT

A document management apparatus includes a processor configured to: receive information on document data which is a target of image formation, and authentication destination information; issue information on a reservation associated with the received information on the document data and the received authentication destination information; on receipt of information on a reservation, obtain authentication information of a user who has entered the information on the reservation; request an authentication destination specified from authentication destination information associated with the information on the reservation to perform authentication using the obtained authentication information of the user; and, in a case of successful authentication, apply control to permit an output of document data specified from information on document data associated with the information on the reservation.

20 Claims, 14 Drawing Sheets

(56) References Cited

U.S. PATENT DOCUMENTS

2014/0313544 A1* 10/2014 Hasegawa ............. G06F 3/1243
                                                  358/1.15
2020/0319833 A1* 10/2020 Nakamori ............. G06F 3/1288

* cited by examiner

FIG. 4

| DOCUMENT FILE NAME | RESERVATION CODE | AUTHENTICATION DESTINATION INFORMATION | BILLING DESTINATION INFORMATION |
|---|---|---|---|
| 20200905I015. PDF | 312ABC516X | COMPANY A | COMPANY A, FIRST DEPARTMENT |
| 20200903I820. PDF | 2196CCF752 | COMPANY A | COMPANY A, SECOND DEPARTMENT |
| 20200902I150. PDF | 32AB15C620 | COMPANY C | COMPANY C |
| 20200901O853. PDF | A4CB6AA325 | COMPANY D | COMPANY D |

| AUTHENTICATION DESTINATION INFORMATION | AUTHENTICATION SERVER | AUTHENTICATION METHOD | AUTHENTICATION TERMS | CRYPTOGRAPHIC COMMUNICATION PROTOCOL | BILLING DESTINATION INFORMATION | ID |
|---|---|---|---|---|---|---|
| COMPANY A | XXX.XXX.XXX.XXX | ID + PASSWORD | EMPLOYEE ID, PASSWORD | TLS1.1 | COMPANY A, FIRST DEPARTMENT | 0001 |
| COMPANY A | XXX.XXX.XXX.XXX | ID + PASSWORD | EMPLOYEE ID, PASSWORD | TLS1.2 | COMPANY A, SECOND DEPARTMENT | 0002 |
| COMPANY B | YYY.YYY.YYY.YYY | IC CARD | EMPLOYEE ID CARD | TLS1.3 | COMPANY C | 0003 |
| COMPANY C | ZZZ.ZZZ.ZZZ.ZZZ | FINGERPRINT AUTHENTICATION | FINGERPRINT | TLS1.2 | COMPANY C | 0004 |

215

DOCUMENT MANAGEMENT APPARATUS CAPABLE OF OUTPUTTING PRINT DATA FOR WHICH A PRINT RESERVATION IS MADE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-202390 filed Dec. 7, 2020.

BACKGROUND

(i) Technical Field

The present disclosure relates to a document management apparatus and a non-transitory computer readable medium.

(ii) Related Art

Japanese Unexamined Patent Application Publication No. 2016-146137 discloses a billing management system as follows. To print a document in an organization using a public printer under management of a public print server, a user makes a print reservation request to the organization's internal print server. In response to the request, the system sends a use reservation request including information on a billing destination selected by the user to the public print server. The public print server issues a reservation identification (ID), and saves the information on the billing destination in association with the reservation ID. When printing is performed by the reservation ID with the public printer, the system transmits the information on the billing destination and information on a fee to the internal print server, thereby charging the fee.

Japanese Patent No. 5779971 discloses an image processing apparatus that performs authentication with an appropriate security strength in accordance with an image processing job. The image processing apparatus includes: an obtaining unit that obtains an image processing job; an image processor that executes the image processing job obtained by the obtaining unit; a determination unit that determines a security strength based on the image processing job obtained by the obtaining unit; an authentication request unit that requests authentication from a server with the security strength determined by the determination unit; and a receiving unit that receives, from the server, an authentication result of the authentication requested by the authentication request unit. On receipt by the receiving unit of an authentication result indicating successful authentication from the server, the image processing apparatus executes a copy job.

Japanese Unexamined Patent Application Publication No. 2014-178899 discloses an information processing apparatus that allows a user to select a billing method. The information processing apparatus includes: a first billing controller that, in a case where billing is possible by a prepaid billing method that requires a user to pay a fee in advance with a fee paying machine, releases a restriction on using an image forming apparatus; a second billing controller that, in a case where billing is possible by a postpaid billing method that requires a user who has been authenticated by user authentication to pay a fee afterwards, releases a restriction on using the image forming apparatus; and a billing method controller that allows the user to select either billing by the first method or billing by the second method.

SUMMARY

Aspects of non-limiting embodiments of the present disclosure relate to providing a document management apparatus capable of outputting print data for which a print reservation has been made, after a user is authenticated using the user's authentication information at an authentication destination designated by the user upon making the print reservation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document management apparatus including a processor configured to: receive information on document data which is a target of image formation, and authentication destination information; issue information on a reservation associated with the received information on the document data and the received authentication destination information; on receipt of information on a reservation, obtain authentication information of a user who has entered the information on the reservation; request an authentication destination specified from authentication destination information associated with the information on the reservation to perform authentication using the obtained authentication information of the user; and, in a case of successful authentication, apply control to permit an output of document data specified from information on document data associated with the information on the reservation.

BRIEF DESCRIPTION OF THE DRAWINGS

An exemplary embodiment of the present disclosure will be described in detail based on the following figures, wherein:

FIG. 4 is a diagram illustrating an example of a reserved document database held by the document management apparatus of the present exemplary embodiment;

FIG. 5 is a diagram illustrating an example of an authentication/billing destination database held by the document management apparatus of the present exemplary embodiment;

DETAILED DESCRIPTION

A document management system 10 including a document management apparatus 200 according to the present disclosure will be described as an exemplary embodiment with reference to the drawings. Note that the following exemplary embodiment is for illustrating an authentication apparatus of the present disclosure, and it is not intended to limit the present disclosure to the following exemplary embodiment.

Figure 1:
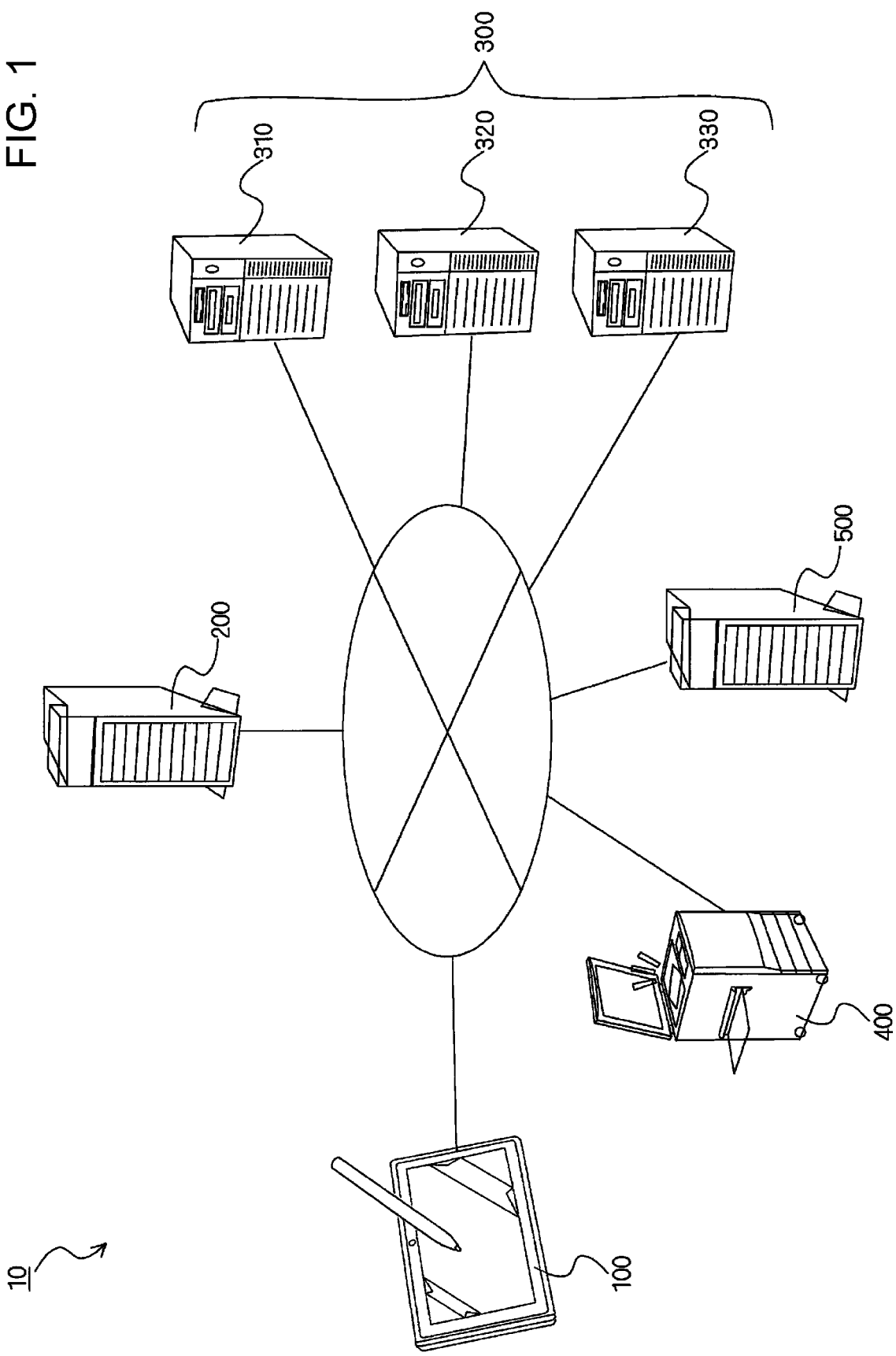
FIG. 1 is an overall conceptual diagram illustrating a document management system according to an exemplary embodiment.

FIG. 1 is an overall conceptual diagram illustrating an example of the document management system 10. As illustrated in FIG. 1, the document management system 10 includes a terminal apparatus 100, the document management apparatus 200, a plurality of authentication servers 310, 320, and 330, an image forming apparatus 400, and a billing management server 500, and these apparatuses are connected to one another by the Internet 600. Note that the document management system 10 may include multiple terminal apparatuses 100, multiple image forming apparatuses 400, and multiple billing management servers 500, and each of them may be individually connected to the Internet 600. However, to simplify the description in the present exemplary embodiment, the case in which only one terminal apparatus 100, one image forming apparatus 400, and one billing management server 500 are connected to the Internet 600 will be described. In the following description, the authentication servers 310, 320, and 330 will be simply referred to as authentication servers 300 when they are not particularly distinguished from one another.

The terminal apparatus 100 is owned or operated by a user. The terminal apparatus 100 is a mobile terminal apparatus such as a tablet computer or a smartphone, a laptop personal computer, or a desktop personal computer. By operating application software installed in the terminal apparatus 100, the user operates a user interface of the terminal apparatus 100, and makes a print reservation for the document management apparatus 200 by transmitting information on document data, which is a target of image formation by the image forming apparatus 400, authentication destination information, and billing destination information.

Here, document data is data from which an image may be formed, such as document file data or image file data created with the terminal apparatus 100 or saved in a server connected to the terminal apparatus 100 via the Internet 600, or file data in a page description language (PDL) format for image formation, which is obtained by converting a document file or an image file. In addition, information on document data is, in addition to the document data itself, document detailed information, such as the file name, creation date, and user information of the document data, and the PDL used in the document data. In addition, the terminal apparatus 100 receives information on a reservation issued in response to the print reservation, and reports that to the user via the user interface.

As will be described later, the document management apparatus 200 receives information on document data, authentication destination information, and billing destination information, which are sent from the terminal apparatus 100, stores the received items of information in the reserved document database 214, issues information on a reservation associated with the received information on the document data and the received authentication information, and returns the issued information on the reservation to the terminal apparatus 100.

On receipt of information on a reservation from the image forming apparatus 400, the document management apparatus 200 further obtains authentication destination information and billing destination information of a user who has entered the information on the reservation, and returns the obtained items of information to the image forming apparatus 400.

On receipt of a successful authentication report from an authentication server 300 via the image forming apparatus 400 and a document data request from the image forming apparatus 400, the document management apparatus 200 transmits document data corresponding to the print reservation to the image forming apparatus 400, thereby allowing the user to form and output an image of the document data using the image forming apparatus 400.

On receipt of an authentication request along with authentication information of a user who has entered information on a reservation from the image forming apparatus 400, an authentication server 300 performs authentication of the user's authentication information, and, in the case of successful authentication, transmits a successful authentication report to the image forming apparatus 400. Note that each of the authentication servers 300 performs authentication by a method designated by an authentication/billing destination database 215. Note that authentication information is user information necessary for determining whether the user is a person permitted to execute image formation, and includes information manually entered by the user, such as an ID and a password, information stored in an integrated circuit (IC) card, and biometric information such as the user's face image or fingerprint information.

The image forming apparatus 400 is installed in a facility used by unspecified users, such as a shared office or a convenience store. On receipt of an entry of information on a reservation issued by the document management apparatus 200, the image forming apparatus 400 transmits the information on the reservation to the document management apparatus 200, and obtains authentication destination information and billing destination information from the document management apparatus 200.

On receipt of an entry of information on a reservation issued by the document management apparatus 200, the image forming apparatus 400 further obtains authentication information of a user who has entered the information on the reservation, and requests an authentication server 300 at an authentication destination specified by the authentication destination information to perform authentication using the obtained authentication information of the user, that is, transmits the authentication information and requests authentication. In the case of successful authentication, that is, on receipt of a successful authentication report from the authentication server 300, the image forming apparatus 400 reports that the authentication was successful to the document management apparatus 200, requests document data specified from information on document data associated with the above-mentioned information on the reservation, and permits an output of document data received from the document management apparatus 200. In short, the image forming apparatus 400 forms an image of document data received from the document management apparatus 200. The image forming apparatus 400 further transmits billing information to the billing management server 500 at a billing destination specified by billing destination information obtained from the document management apparatus 200, and performs a billing process.

In the case where an image of document data is formed by the image forming apparatus 400, the billing management server 500 receives billing information from the image forming apparatus 400, and performs a billing process by counting up the billing amount.

Figure 2:
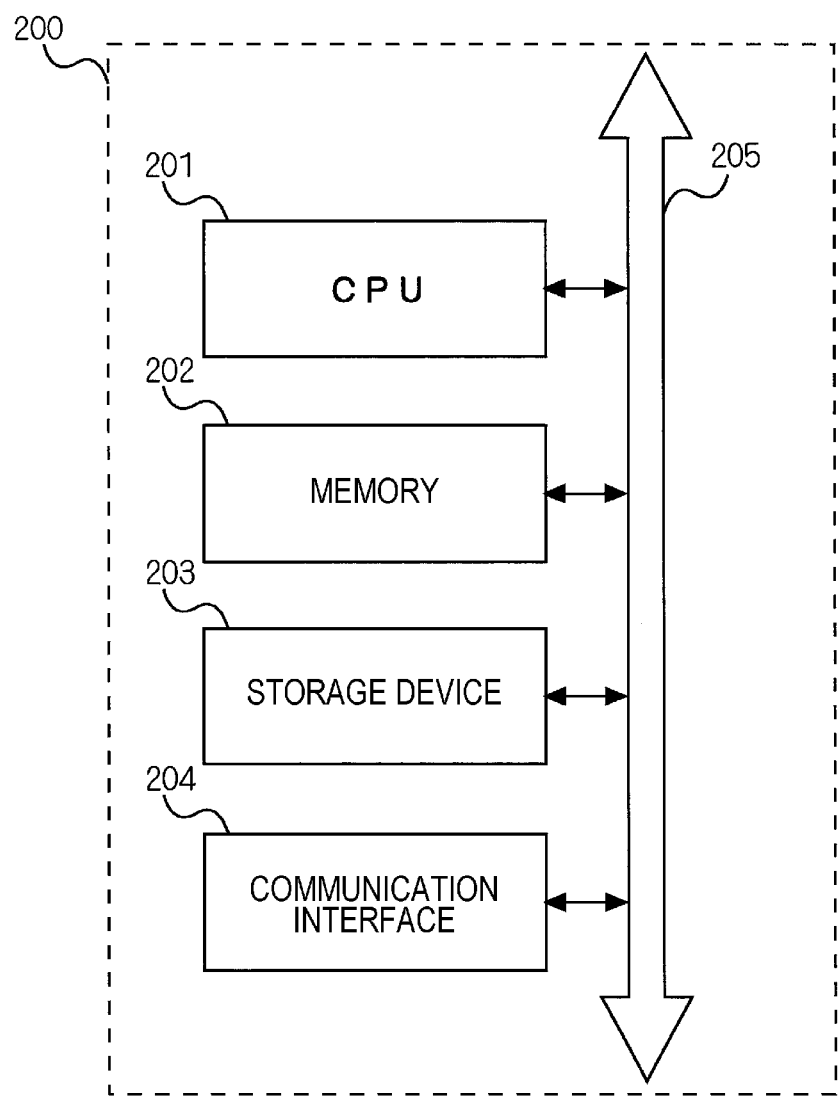
FIG. 2 is a hardware configuration diagram of a document management apparatus of the exemplary embodiment.
Figure 3:
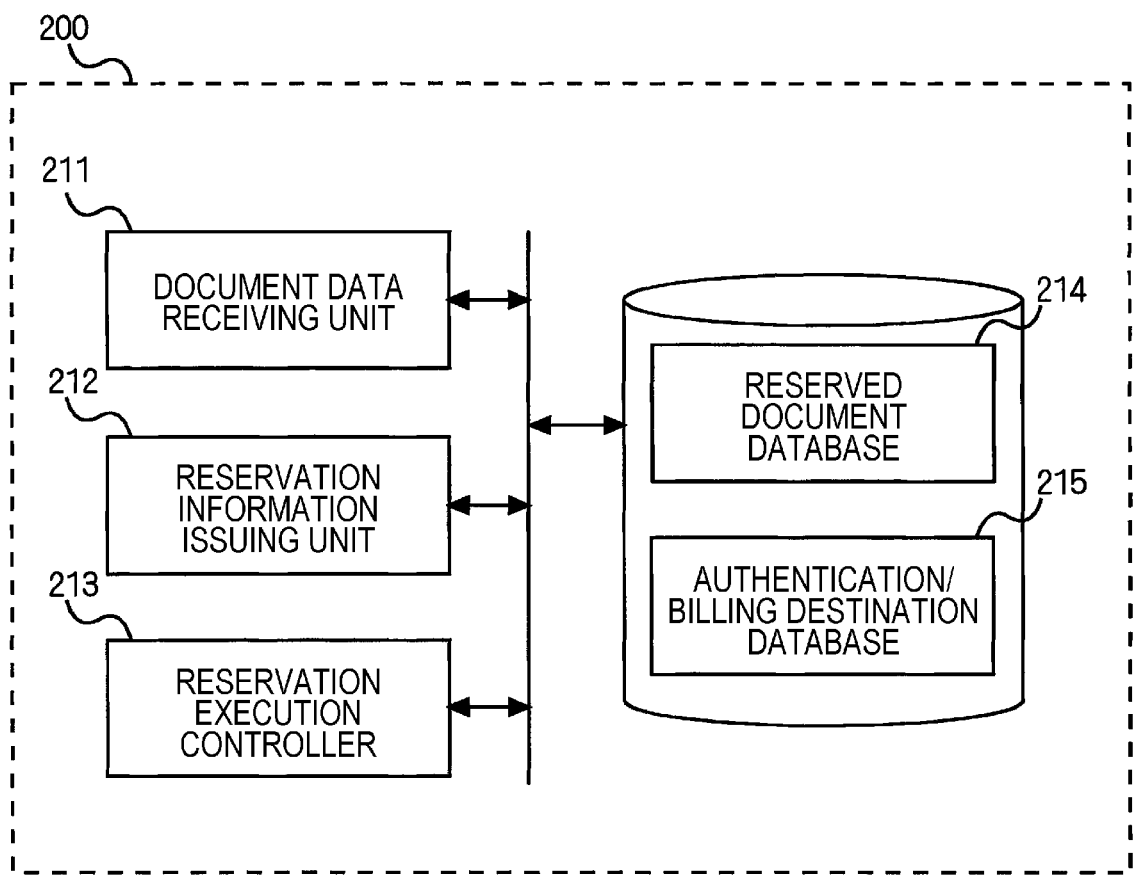
FIG. 3 is a functional block diagram of the document management apparatus of the present exemplary embodiment.

Next, the document management apparatus 200 of the present exemplary embodiment will be described with reference to FIGS. 2 and 3. FIG. 2 is a hardware configuration diagram of the document management apparatus 200, and FIG. 3 is a functional block diagram of the document management apparatus 200. As illustrated in FIG. 2, the document management apparatus 200 includes a central processing unit (CPU) 201, memory 202, a storage device 203, and a communication interface 204, and each of them is connected to a control bus 205.

The CPU 201 is a microprocessor for control, and controls the operation of each unit of the document management apparatus 200 on the basis of a control program stored in the storage device 203.

The memory 202 temporarily stores document data and information on a reservation received from the terminal apparatus 100.

The storage device 203 includes a hard disk drive (HDD) or a solid-state drive (SSD), and stores a control program for controlling each unit of the document management apparatus 200.

The communication interface 204 performs communication control for communicating with the terminal apparatus 100 and the image forming apparatus 400, which are connected via the Internet 600.

In addition, as illustrated in FIG. 3, the document management apparatus 200 executes the control program stored in the storage device 203, thereby functioning as a document data receiving unit 211, a reservation information issuing unit 212, and a reservation execution controller 213. In addition, the document management apparatus 200 stores the reserved document database 214 and the authentication/billing destination database 215, which will be described later, in the storage device 203.

The document data receiving unit 211 receives information on document data, authentication destination information, and billing destination information, which are sent from the terminal apparatus 100, and stores the document data, the authentication destination information, and the billing destination information in association with one another in the later-described reserved document database 214. The authentication destination information includes any of or a combination of items of information such as the name and ID of an organization at the authentication destination, and the IP address of a server at the authentication destination. In addition, the billing destination information is information on a partner organization that performs a billing process, and is specified by any of or a combination of items of information such as the name and ID of an organization at the billing destination, and the IP address of the billing management server 500 at the billing destination. The user designates the authentication destination and the billing destination by selecting, for example, a company name(s) or an organization name(s). Note that the authentication destination and the billing destination may be different organizations or the same organization.

The reservation information issuing unit 212 issues information on a reservation, which corresponds to the received document data, returns the issued information on the reservation to the terminal apparatus 100, and stores the information on the reservation in association with the document data, the authentication destination information, and the billing destination information in the reserved document database 214. Note that the information on the reservation includes reservation detailed information such as the reservation number, reservation user name, reservation time, document name of reserved document data, and reservation expiration date. Note that the reservation number is not limited to a number expressed by numerals, and may be reservation code including symbols and characters or a reservation image that represents the reservation detailed information as an image. In the present exemplary embodiment, the case of issuing reservation code will be described by way of example.

On receipt of information on a reservation from the image forming apparatus 400, the reservation execution controller 213 obtains authentication destination information and billing destination information that are associated with the information on the reservation from the reserved document database 214, and returns the obtained items of information to the image forming apparatus 400. On receipt of a successful authentication report from an authentication server 300 via the image forming apparatus 400 and a document data request from the image forming apparatus 400, the reservation execution controller 213 obtains document data associated with the above-mentioned information on the reservation from the reserved document database 214, and transmits the obtained document data to the image forming apparatus 400, thereby allowing the user to form and output an image of the document data using the image forming apparatus 400.

The reserved document database 214 stores document data, authentication destination information, and billing destination information, which are received by the document data receiving unit 211 from the terminal apparatus 100, and information on a reservation, which is issued by the reservation information issuing unit 212, in association with one another.

FIG. 4 illustrates an example of the reserved document database 214. As illustrated in FIG. 4, in the reserved document database 214, for example, the document file name "20200905105.PDF", the reservation code "312ABC516X", which is information on a reservation issued by the reservation information issuing unit 212, the authentication destination information "Company A", and the billing destination information "Company A, First Department" are registered in association with one another. Note that the information on the reservation is identification information for uniquely identifying the document data transmitted from the terminal apparatus 100, and may be, besides reservation code including a combination of numerals and alphabet characters, a reservation number that only includes numerals, or two-dimensional code that represents reservation code or a reservation number as an image.

The authentication/billing destination database 215 stores information on each authentication destination and its authentication server, an authentication method adopted by the authentication destination, terms for authentication, an authentication communication protocol, and information on a billing destination in association with one another.

FIG. 5 illustrates an example of the authentication/billing destination database 215. In FIG. 5, for the authentication destination information "Company A", the authentication server location "XXX.XXX.XXX.XXX", the authentication method "ID+password", the terms for authentication "employee ID, password", which are namely the terms used for displaying an authentication screen, the authentication communication protocol "TLS 1.1", the billing destination information "Company A, First Department", and the billing destination ID "0001" are stored in association with one another. In contrast, for the authentication destination information "Company B", the authentication server location "YYY.YYY.YYY.YYY", the authentication method "IC card", the terms for authentication "employee ID card", the authentication communication protocol "TLS 1.3", the billing destination information "Company C", and the billing destination ID "0003" are stored in association with one another. That is, document data to be authenticated at "Company A" is subjected to authentication using "ID+password", whereas document data to be authenticated at "Company B" is subjected to authentication using "IC card". Note that the authentication/billing destination database 215 may further store more detailed information. For example, the detailed information includes the following: in the case of performing authentication using an IC card, information such as the type and format of the card, and which byte of data is to be transmitted; in the case of performing face authentication and extracting a feature amount from a face image, the type and parameters of an algorithm; and, in the case of processing a face image on the authentication server 300 side, parameters such as the image size and brightness to be obtained.

The authentication servers 300 are servers owned and/or operated by respective companies and/or organizations. On receipt of an authentication request along with authentication information of a user who has entered information on a reservation from the image forming apparatus 400, an authentication server 300 performs authentication of the user's authentication information, and, in the case of successful authentication, transmits a successful authentication report to the image forming apparatus 400. Note that each of the authentication servers 300 performs authentication by a method designated by the authentication/billing destination database 215.

The image forming apparatus 400 is installed in a facility used by unspecified users, such as a shared office or a convenience store. On receipt of an entry of information on a reservation issued by the document management apparatus 200, the image forming apparatus 400 transmits the information on the reservation to the document management apparatus 200, and obtains authentication destination information and billing destination information from the document management apparatus 200.

Furthermore, the image forming apparatus 400 obtains authentication information of a user who has entered the above-mentioned information on the reservation, transmits the authentication information to an authentication server 300 at an authentication destination specified by the authentication destination information, and requests the authentication server 300 to perform authentication. On receipt of a successful authentication report from the authentication server 300, the image forming apparatus 400 reports that the authentication was successful to the document management apparatus 200, requests document data from the document management apparatus 200, and forms an image using the document data received from the document management apparatus 200. The image forming apparatus 400 further transmits billing information to the billing management server 500 at a billing destination specified by billing destination information obtained from the document management apparatus 200, and performs a billing process.

Figure 6:
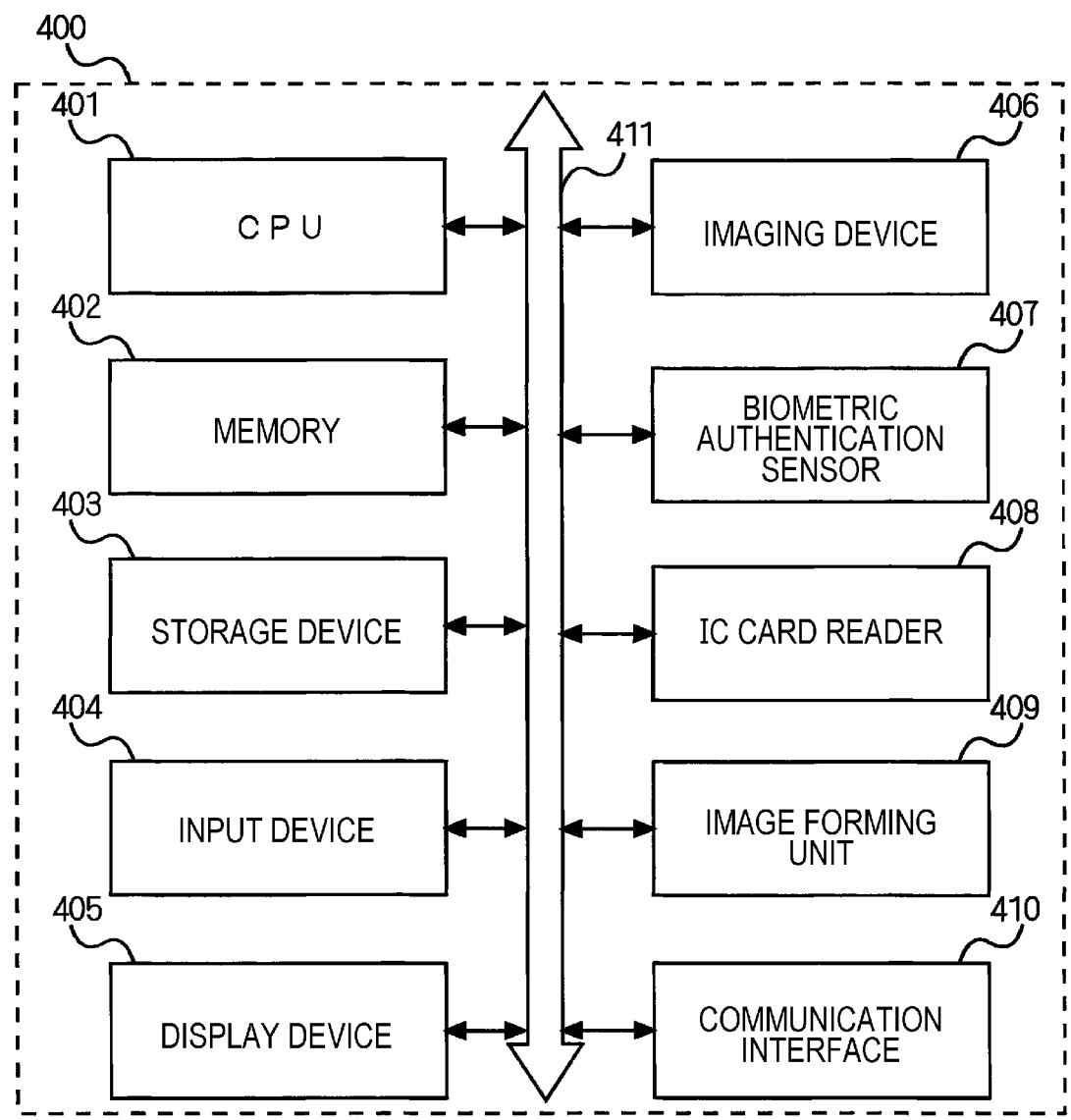
FIG. 6 is a hardware configuration diagram of an image forming apparatus of the present exemplary embodiment.
Figure 7:
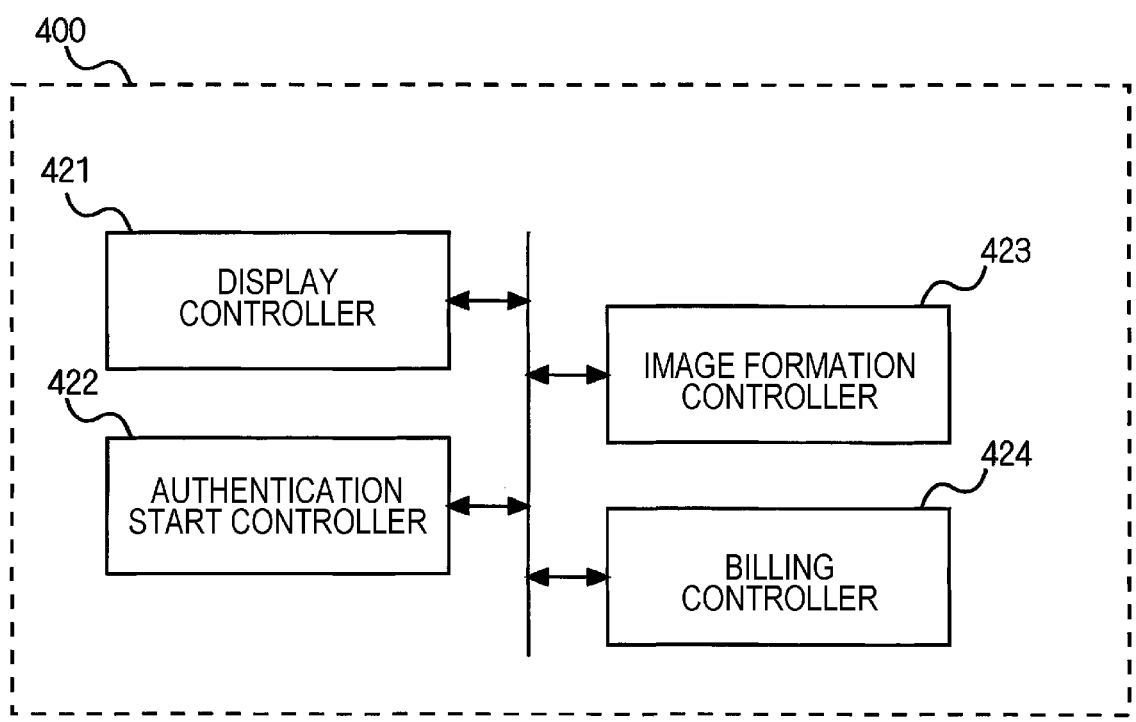
FIG. 7 is a functional block diagram of the image forming apparatus of the present exemplary embodiment.

The image forming apparatus 400 will be described with reference to FIGS. 6 and 7. FIG. 6 is a hardware configuration diagram of the image forming apparatus 400, and FIG. 7 is a functional block diagram of the image forming apparatus 400. As illustrated in FIG. 6, the image forming apparatus 400 includes a CPU 401, memory 402, a storage device 403, an input device 404, a display device 405, an imaging device 406, a biometric authentication sensor 407, an IC card reader 408, an image forming unit 409, and a communication interface 410, and each of them is connected to a control bus 411. Although the input device 404, the display device 405, the imaging device 406, the biometric authentication sensor 407, and the IC card reader 408 may be installed separately from the image forming apparatus 400, to make the description simple in the present exemplary embodiment, the case in which these devices 404 to 408 are installed integrally with the image forming apparatus 400 will be described.

The CPU 401 is a microprocessor for control, and controls the operation of each unit of the image forming apparatus 400 on the basis of a control program stored in the storage device 403.

The memory 402 temporarily stores images captured by the imaging device 406 and information obtained by the biometric authentication sensor 407 and the IC card reader 408. In addition, the memory 402 temporarily stores image data to be printed by the image forming unit 409 of the image forming apparatus 400.

The storage device 403 includes an HDD or an SSD, and stores a control program for controlling each unit of the image forming apparatus 400.

The input device 404 is a touchscreen formed on the surface of the later-described display device 405. When the user operates the touchscreen, the input device 404 receives an entry of reservation information by the user, and the user may perform a menu operation for forming an image. The input device 404 may include, in addition to the touchscreen, mechanical input devices such as an entry keyboard and entry buttons provided in or separately from the image forming apparatus 400.

The display device 405 is a liquid crystal display provided in the image forming apparatus 400. The display device 405 displays various screens including messages for the user, and a menu screen for operating the image forming apparatus 400 in the case of successful authentication.

The imaging device 406 is a camera installed integrally with the image forming apparatus 400. In the case of performing face authentication, the imaging device 406 captures an image for authentication including an image of the user's face, and temporarily stores the captured image in the memory 402.

The biometric authentication sensor 407 is an obtaining device for obtaining biometric information for authentication, such as a fingerprint sensor or a vein sensor, and the obtained information is temporarily stored in the memory 402.

The IC card reader 408 is configured to read information from an IC card in the case of authenticating a user using his/her IC card such as an employee ID card, and the read information is temporarily stored in the memory 402.

The image forming unit 409 executes, as a print job, document data transmitted from the document management apparatus 200, and prints a document needed by the user on paper.

The communication interface 410 performs communication control for communicating with the document management apparatus 200, the authentication servers 300, and the billing management server 500 connected via the Internet 600 using a local area network (LAN) cable or a wireless LAN (not illustrated).

In addition, as illustrated in FIG. 7, the image forming apparatus 400 executes the control program stored in the storage device 403, thereby functioning as a display controller 421, an authentication start controller 422, an image formation controller 423, and a billing controller 424.

The display controller 421 applies control to display, on the display device 405, a reservation code entry screen for prompting the user to enter information on a reservation, that is, reservation code, issued for document data to form an image, or an authentication screen for authenticating a user who is operating the image forming apparatus 400.

The authentication start controller 422 receives an entry of reservation code by the user, and, when the user operates the input device 404 to enter reservation code, transmits the reservation code to the document management apparatus 200, and obtains authentication destination information and an authentication method from the document management apparatus 200. The authentication start controller 422 obtains authentication information of the user by an authentication method specified from authentication destination information associated with the reservation code, and requests authentication from an authentication server 300 indicated by the authentication destination information. On receipt of a successful authentication report from the authentication server 300, the authentication start controller 422 obtains document data from the document management apparatus 200.

The image formation controller 423 controls the image forming unit 409, and prints document data obtained from the document management apparatus 200.

When image formation is executed by the image formation controller 423, the billing controller 424 generates billing information in accordance with the contents of the image formation, and transmits the generated billing information to the billing management server 500.

Figure 8:
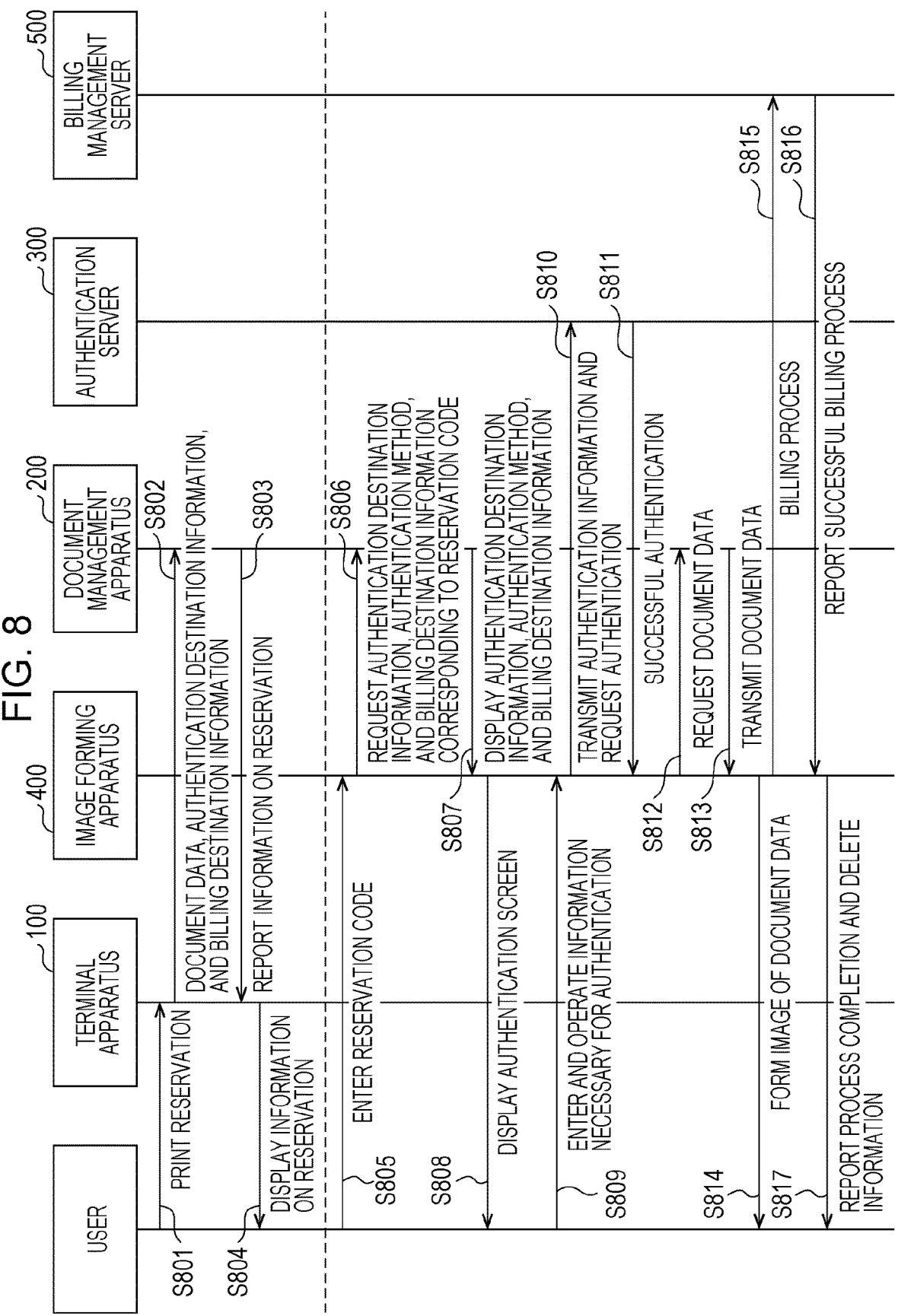
FIG. 8 is a sequence diagram illustrating the flow of operation in the document management system of the present exemplary embodiment.

Next, the operation of the document management system 10 will be described with reference to FIG. 8. FIG. 8 is a sequence diagram illustrating the flow of operation in the document management system 10 of the present exemplary embodiment. In step S801 in FIG. 8, the user operates the terminal apparatus 100 to create a document to form an image using the image forming apparatus 400, transmits document data, authentication destination information, and billing destination information to the document management apparatus 200, and makes a print reservation. On this occasion, authentication destination information and billing destination information may be directly and explicitly designated by the user. Alternatively, application software installed in advance in the terminal apparatus 100 may automatically add authentication destination information and billing destination information to the document data on the basis of user information, and transmit these items of data to the document management apparatus 200.

Figure 9:
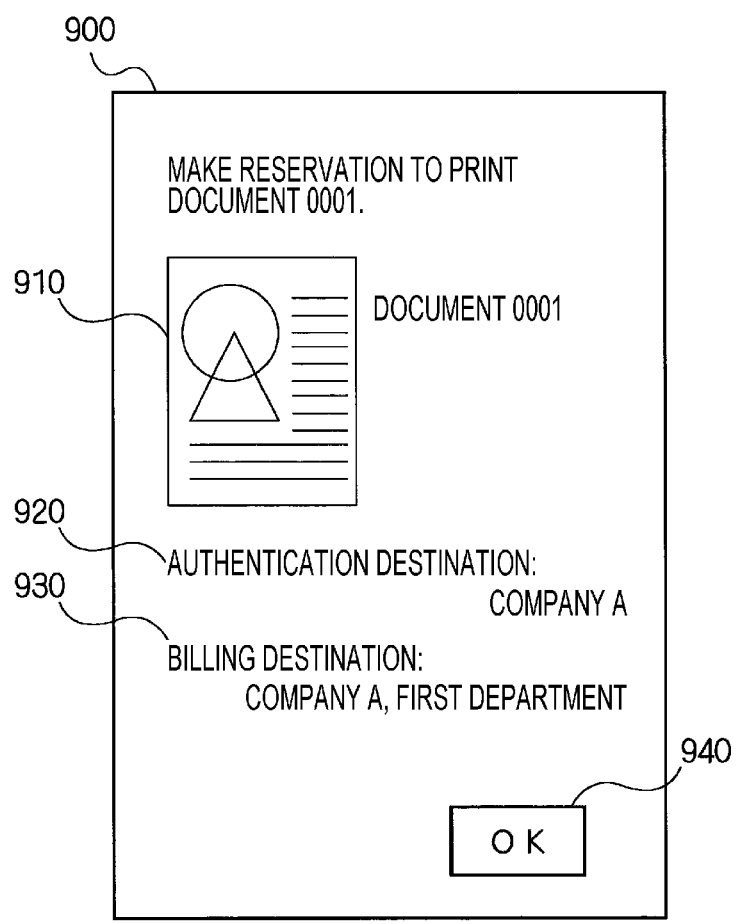
FIG. 9 is a diagram illustrating an example of a print reservation screen indicated on a terminal apparatus.

FIG. 9 is a diagram illustrating an example of a print reservation screen 900 indicated on the terminal apparatus 100. On the print reservation screen 900, print-reserved document information 910, authentication destination information 920, such as "Company A", and billing destination information 930, such as "Company A, First Department", are displayed. When the user checks the print reservation screen 900 and selects an "OK" button 940, in step S802 in FIG. 8, the document data, the authentication destination information, and the billing destination information are transmitted to the document management apparatus 200. Note that the document data may remain as the document data in a file format created with the terminal apparatus 100, or may be data converted to a format printable on the terminal apparatus 100, such as a PDL format.

When the document management apparatus 200 receives these items of information, in step S803, the reservation information issuing unit 212 issues information on a reservation, which corresponds to the received document data, transmits the issued information on the reservation to the terminal apparatus 100, and saves the information on the reservation in association with the document data, the authentication destination information, and the billing destination information in the reserved document database 214.

Figure 10:
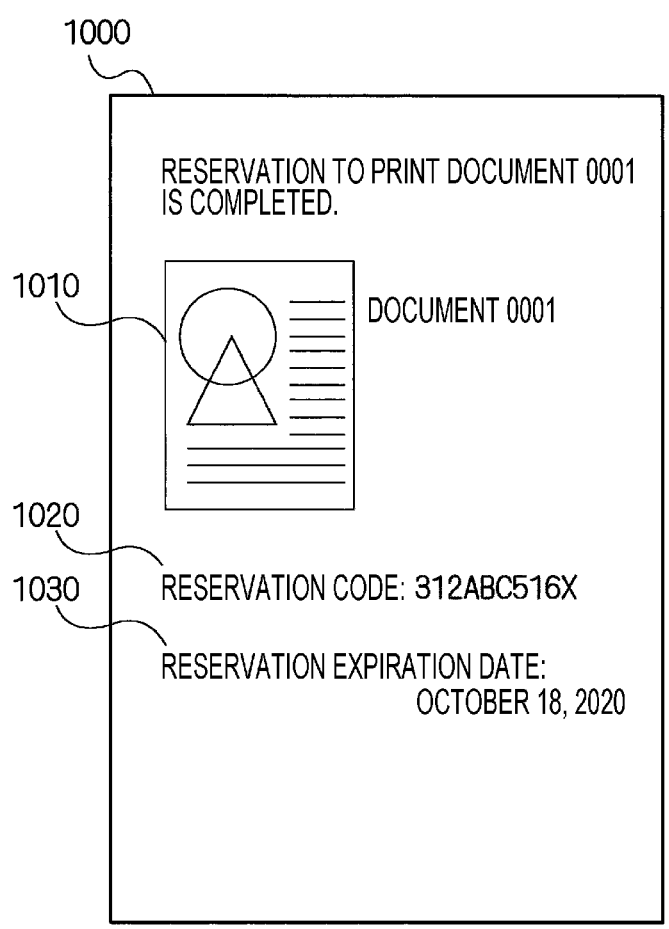
FIG. 10 is a diagram illustrating an example of a reservation information report screen indicated on the terminal apparatus.

On receipt of the information on the reservation from the document management apparatus 200, in step S804, the terminal apparatus 100 generates a reservation information report screen 1000 as illustrated in FIG. 10, and reports the screen 1000 to the user. On the reservation information report screen 1000, items of information on the reservation including reserved document information 1010, reservation code 1020, such as "312ABC516X", and a reservation expiration date 1030, such as "Oct. 18, 2020", are displayed. The user stores these items of information on the reservation, or records these items of information in another way.

Figure 11:
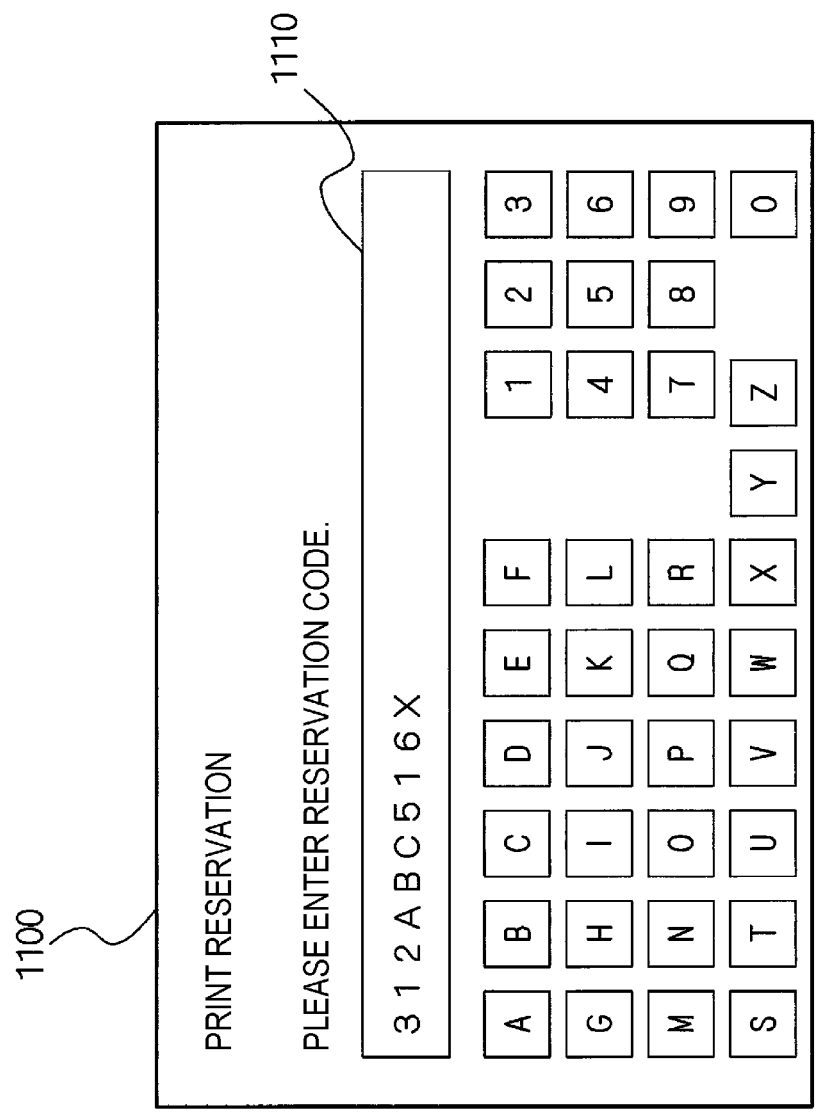
FIG. 11 is a diagram illustrating an example of a reserved printing entry screen displayed on a display device of the image forming apparatus.

Next, in step S805, the user operates the input device 404 of the image forming apparatus 400 installed in a convenience store or the like, and enters reservation code. FIG. 11 is a diagram illustrating an example of a reserved printing entry screen 1100 displayed on the display device 405 of the image forming apparatus 400. The reserved printing entry screen 1100 includes, for example, a reservation code entry field 1110, and the user enters the reservation code "312ABC516X", which is reported in step S804, using the input device 404 displayed on the display device 405.

When the user enters the reservation code, in step S806, the authentication start controller 422 transmits the reservation code to the document management apparatus 200.

On receipt of the reservation code from the image forming apparatus 400, in step S807, the reservation execution controller 213 of the document management apparatus 200 obtains authentication destination information, billing destination information, information on the authentication server, and information on the authentication method, which are associated with the information on the reservation, that is, the reservation code, from the reserved document database 214 and the authentication/billing destination database 215, and returns the obtained items of information to the image forming apparatus 400. For example, "Company A", which is the authentication destination information, and "Company A, First Department", which is the billing destination information, are associated with the reservation code "312ABC516X". The reservation execution controller 213 obtains, from the authentication/billing destination database 215, the authentication destination server information "XXX.XXX.XXX.XXX", the authentication method "ID+ password", the terms for authentication "employee ID, password", and the billing destination ID "0001" corresponding to the above items of information, and transmits the obtained items of information to the image forming apparatus 400.

Figure 12:
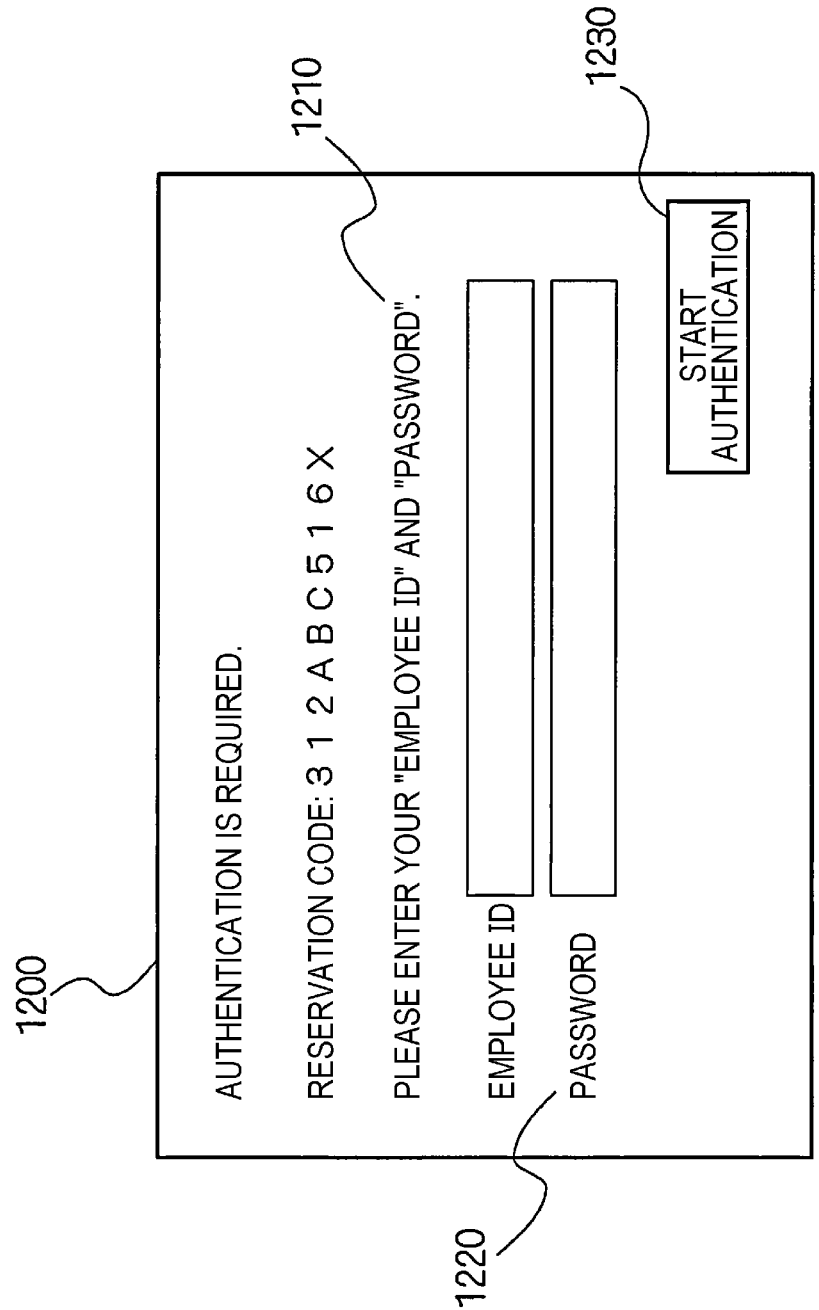
FIG. 12 is a diagram illustrating an example of an authentication screen displayed on the display device of the image forming apparatus.

In step S808, the authentication start controller 422 and the display controller 421 of the image forming apparatus 400 display an authentication screen 1200 as illustrated in FIG. 12 in accordance with the authentication method received from the document management apparatus 200. In short, the user's authentication information is obtained by an authentication method that is different for every authentication destination specified from authentication destination information associated with reservation code. On the authentication screen 1200 displayed at this time, different terms for authentication set for every authentication destination, received from the document management apparatus 200, are used. In short, the display device 405 of the image forming apparatus 400 displays an authentication screen that is different for every authentication destination. FIG. 12 is a diagram illustrating an example of the authentication screen 1200 displayed on the display device 405 of the image forming apparatus 400. The authentication screen 1200 includes an authentication information entry request message 1210 using terms for authentication received from the document management apparatus 200, an authentication information entry field 1220 in accordance with an authentication method received from the document management apparatus 200, and a "start authentication" button 1230. Because terms for authentication are changed for every authentication destination, the user may easily grasp what the required authentication information is.

When the user operates the input device 404 of the image forming apparatus 400 to enter authentication information in step S809, in step S810, the authentication start controller 422 of the image forming apparatus 400 transmits the authentication information to an authentication server 300 specified on the basis of authentication server information received from the document management apparatus 200 in step S807, and requests authentication.

The authentication server 300 performs authentication on the basis of the authentication information received from the image forming apparatus 400, and, if the user's information is registered in a database in the authentication server 300, the authentication server 300 regards that the authentication was successful, and transmits a successful authentication report to the image forming apparatus 400 in step S811.

When the image forming apparatus 400 receives a successful authentication report from the authentication server 300, in step S812, the authentication start controller 422 transmits a request for obtaining document data associated with the reservation code to the document management apparatus 200. In step S813, in response to the request for obtaining this document data, the reservation execution controller 213 of the document management apparatus 200 obtains the document data from the reserved document database 214, and transmits the document data to the image forming apparatus 400.

In step S814, the image formation controller 423 of the image forming apparatus 400 forms an image of the document data received from the document management apparatus 200 on paper. On this occasion, the authentication server 300 may specify the method of image formation permitted to the user, and the user may form an image within the permitted range of image formation. For example, if the authentication server 300 only permits monochrome printing to the user, monochrome printing of the document is executed by the image forming apparatus 400.

In response to completion of the image formation, in step S815, the billing controller 424 of the image forming apparatus 400 generates billing information in accordance with the contents of the executed image forming process, transmits the generated billing information to the billing management server 500 at a billing destination specified from the billing destination information, and requests the billing management server 500 to perform a billing process.

The billing management server 500 performs a billing process by counting up the billing amount at the billing destination corresponding to the image-formed document data, and, in step S816, transmits a successful billing process report to the image forming apparatus 400. In step S817, the billing controller 424 and the display controller 421 of the image forming apparatus 400 display a screen reporting a successful billing process on the display device 405. Furthermore, the authentication start controller 422 of the image forming apparatus 400 deletes information such as the reservation code and the document data, and ends the process.

Figure 13:
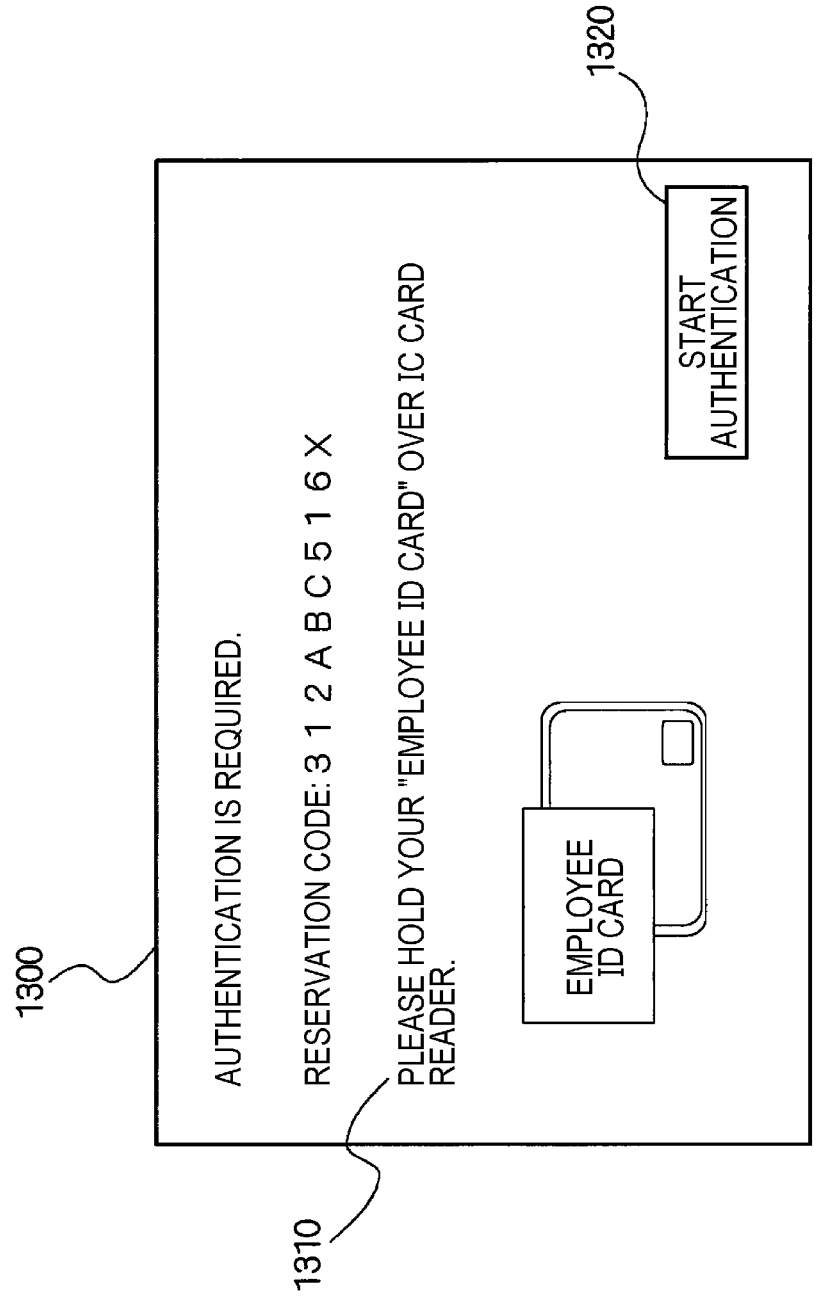
FIG. 13 is a diagram illustrating an example of an authentication screen displayed on the display device of the image forming apparatus.

Although the case in which the authentication method at an authentication destination associated with reservation code is performed in response to an entry of an ID and a password has been described in the above description, this is not the only possible authentication method in the present disclosure. For example, in the case where the authentication method at an authentication destination associated with reservation code is an IC card, authentication may be performed by, with the use of the IC card reader 408, holding an employee ID card including an embedded IC chip over the IC card reader 408. In that case, the display device 405 of the image forming apparatus 400 displays an authentication screen 1300 as illustrated in FIG. 13. FIG. 13 is a diagram illustrating an example of the authentication screen 1300 displayed on the display device 405 of the image forming apparatus 400. The authentication screen 1300 includes an authentication information entry request message 1310 using terms for authentication received from the document management apparatus 200, and a "start authentication" button 1320. When the user holds his/her employee ID card over the IC card reader 408 and selects the "start authentication" button 1320, the IC card reader 408 reads information from the IC chip embedded in the employee ID card, and transmits the read information to the authentication server 300.

Figure 14:
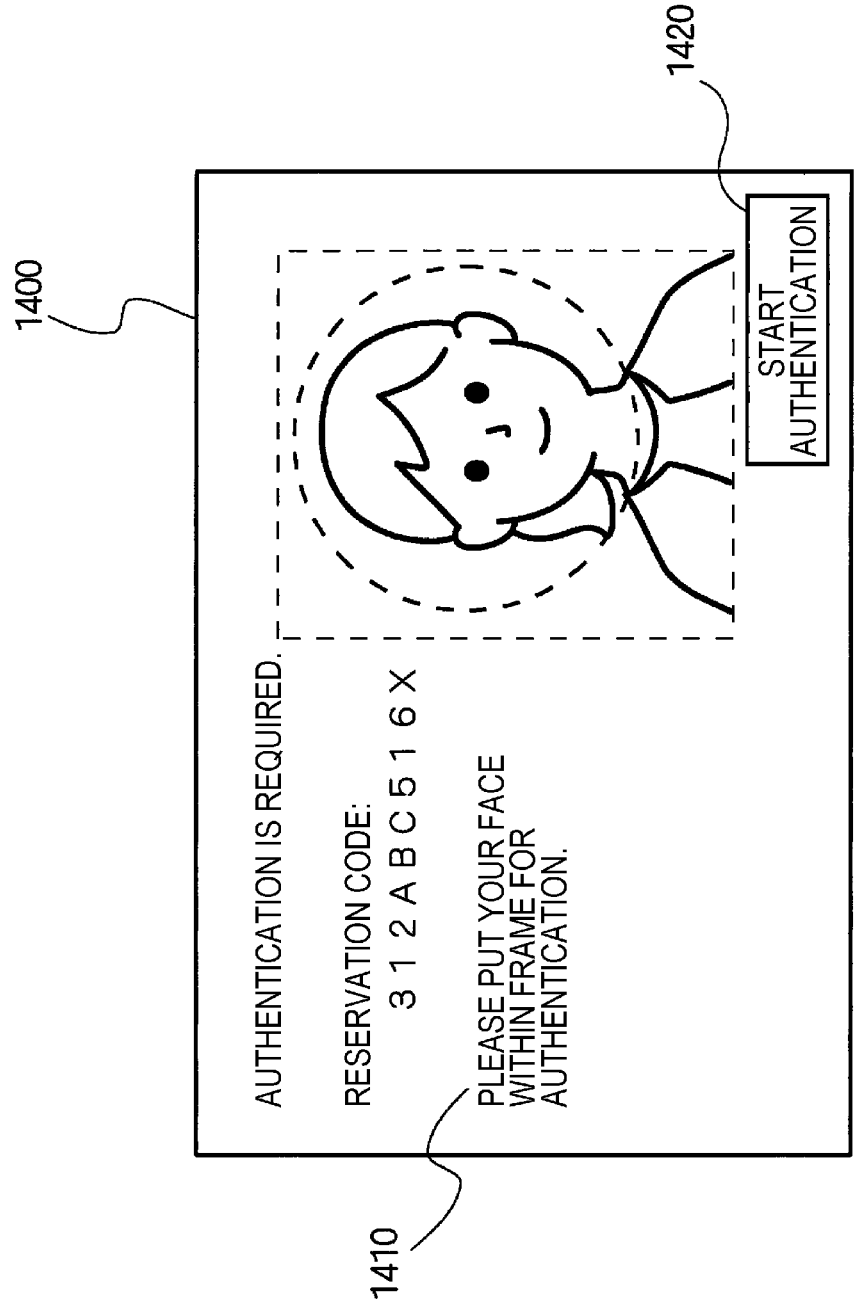
FIG. 14 is a diagram illustrating an example of an authentication screen displayed on the display device of the image forming apparatus.

Alternatively, in the case where the authentication method at an authentication destination associated with reservation code is face authentication, authentication may be performed by capturing a face image with the imaging device 406. In that case, the display device 405 of the image forming apparatus 400 displays an authentication screen 1400 as illustrated in FIG. 14. FIG. 14 is a diagram illustrating an example of the authentication screen 1400 displayed on the display device 405 of the image forming apparatus 400. The authentication screen 1400 includes a message 1410 prompting the user to put his/her face within the frame to capture an image, and a "start authentication" button 1420. When the user selects the "start authentication" button 1420, the imaging device 406 captures an image of the user's face, and transmits the captured image to the authentication server 300. Alternatively, in the case where the authentication method at an authentication destination associated with reservation code is fingerprint authentication, the biometric authentication sensor 407 may be used to obtain fingerprint information to perform authentication.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document management apparatus comprising:
a processor configured to:
receive information on document data which is a target of image formation, and authentication destination information;
issue information on a reservation associated with the received information on the document data and the received authentication destination information;
on receipt of information on the reservation, obtain authentication information of a user who has entered the information on the reservation;
request an authentication destination specified from authentication destination information associated with the information on the reservation to perform authentication using the obtained authentication information of the user; and
in a case of successful authentication, apply control to permit an output of document data specified from information on document data associated with the information on the reservation.

2. The document management apparatus according to claim 1, wherein the processor is configured to apply control to obtain the authentication information of a user who has entered the information on the reservation using an authentication method at an authentication destination specified from authentication destination information associated with the information on the reservation.

3. The document management apparatus according to claim 2, wherein the processor is configured to apply control to use, as an authentication method for every authentication destination, a term for authentication set for every authentication destination.

4. The document management apparatus according to claim 3, wherein the processor is configured to apply control to display, as an authentication method for every authentication destination, an authentication screen that is different for every authentication destination.

5. The document management apparatus according to claim 3, wherein the processor is configured to output document data using a method permitted by the authentication destination to a user who has been successfully authenticated.

6. The document management apparatus according to claim 2, wherein the processor is configured to apply control to display, as an authentication method for every authentication destination, an authentication screen that is different for every authentication destination.

7. The document management apparatus according to claim 6, wherein the processor is configured to output document data using a method permitted by the authentication destination to a user who has been successfully authenticated.

8. The document management apparatus according to claim 2, wherein the processor is configured to output document data using a method permitted by the authentication destination to a user who has been successfully authenticated.

9. The document management apparatus according to claim 1, wherein the processor is configured to apply control to obtain authentication information of a user who has entered the information on the reservation using an authentication method that is different for every authentication destination specified from authentication destination information associated with the information on the reservation.

10. The document management apparatus according to claim 9, wherein the processor is configured to apply control to use, as an authentication method for every authentication destination, a term for authentication set for every authentication destination.

11. The document management apparatus according to claim 10, wherein the processor is configured to apply control to display, as an authentication method for every authentication destination, an authentication screen that is different for every authentication destination.

12. The document management apparatus according to claim 10, wherein the processor is configured to output document data using a method permitted by the authentication destination to a user who has been successfully authenticated.

13. The document management apparatus according to claim 9, wherein the processor is configured to apply control to display, as an authentication method for every authentication destination, an authentication screen that is different for every authentication destination.

14. The document management apparatus according to claim 13, wherein the processor is configured to output document data using a method permitted by the authentication destination to a user who has been successfully authenticated.

15. The document management apparatus according to claim 9, wherein the processor is configured to output document data using a method permitted by the authentication destination to a user who has been successfully authenticated.

16. The document management apparatus according to claim 1, wherein the processor is configured to apply control to display, as an authentication method for every authentication destination, an authentication screen that is different for every authentication destination.

17. The document management apparatus according to claim 16, wherein the processor is configured to output document data using a method permitted by the authentication destination to a user who has been successfully authenticated.

18. The document management apparatus according to claim 1, wherein the processor is configured to output document data using a method permitted by the authentication destination to a user who has been successfully authenticated.

19. The document management apparatus according to claim 1, wherein, in receiving information on document data which is a target of image formation, the processor is configured to further receive billing destination information, and, in a case of successful authentication of the user, perform a billing process for a billing destination specified from the billing destination information.

20. A non-transitory computer readable medium storing a program causing a computer included in a document management apparatus to execute a process, the process comprising:

receiving information on document data which is a target of image formation, and authentication destination information;

issuing information on a reservation associated with the received information on the document data and the received authentication destination information;

on receipt of information on the reservation, obtaining authentication information of a user who has entered the information on the reservation;

requesting an authentication destination specified from authentication destination information associated with the information on the reservation to perform authentication using the obtained authentication information of the user; and in a case of successful authentication, permitting an output of document data specified from information on document data associated with the information on the reservation.

\* \* \* \* \*